(12) United States Patent
Robertson et al.

(10) Patent No.: US 7,516,146 B2
(45) Date of Patent: Apr. 7, 2009

(54) FAST ADAPTIVE DOCUMENT FILTERING

(75) Inventors: Stephen Robertson, London (GB);
Stephen Walker, London (GB); Justin Zobel, Melbourne (AU)

(73) Assignee: Microsoft Corporation, Redmond, WA (US)

( * ) Notice: Subject to any disclaimer, the term of this patent is extended or adjusted under 35 U.S.C. 154(b) by 537 days.

(21) Appl. No.: 10/438,606

(22) Filed: May 15, 2003

(65) Prior Publication Data

US 2004/0230598 A1    Nov. 18, 2004

(51) Int. Cl.
G06F 7/00    (2006.01)
G06F 17/00    (2006.01)

(52) U.S. Cl. ............... 707/102; 707/6; 707/5; 715/526; 709/206

(58) Field of Classification Search .......... 707/5, 707/526, 6, 102, 200, 1
See application file for complete search history.

(56) References Cited

U.S. PATENT DOCUMENTS

| | | | | | |
|---|---|---|---|---|---|
| 6,105,023 | A | * | 8/2000 | Callan | 707/5 |
| 6,463,434 | B2 | * | 10/2002 | Zhai | 707/6 |
| 7,152,063 | B2 | * | 12/2006 | Hoashi et al. | 707/5 |
| 2002/0019827 | A1 | * | 2/2002 | Shiman et al. | 707/200 |
| 2002/0103834 | A1 | * | 8/2002 | Thompson et al. | 707/526 |
| 2002/0161602 | A1 | * | 10/2002 | Dougherty et al. | 705/1 |
| 2003/0074409 | A1 | * | 4/2003 | Bentley | 709/206 |
| 2004/0034652 | A1 | * | 2/2004 | Hofmann et al. | 707/102 |

OTHER PUBLICATIONS ("SIFT—A Tool for Wide-Area Information Dissemination"; Tak W. Yan; Hector Garcia-Molina; Standford, CA: Feb. 16, 1995.*
Witten, Ian H.; Moffat, Alistair; Bell, Timothy C.; "Managing Gigabytes" Inverted File Indexing, chapter 3; Index Construction, chapter 5; pp. 109-114 & pp. 223-260; Morgan Kaufmann Publishers, Inc. San Francisco, CA.
Jones, K. Sparck; Walker, S.; Robertson, S.E.; A Probabilistic Model of Information Retrieval development and Comparative Experiments, Part 1: Jan. 2000; 35 pages; Computer Laboratory, University of Combridge New Museums Site, Pembroke Street, Cambridge.
Jones, K. Sparck; Walker, S.; Robertson, S.E.; A Probabilistic Model of Information Retrieval developement and Comparative Experiments, Part 2; Jan. 2000; 40 pages; Computer Laboratory, University of Combridge New Museums Site, Pembroke Street, Cambridge.
Robertson, Stephen; Walker, Stephen; Threshold Setting in Adaptive Filtering; Journal of Documentation, vol. 56 2000; pp. 312-331 (22 pages).
Yan, Tak W.; Garcia-Molina, Hector; The SIFT Information Dissemination System; 39 pages.
Yan, Tak W.; Garcia-Molina, Hector; SIFT—A Tool for Wide-Area Information Dissemination; Feb. 16, 1995; 10 pages; Stanford, CA.

* cited by examiner

*Primary Examiner*—John E Breene
*Assistant Examiner*—Giovanna Colan

(57) ABSTRACT

Data structures, stored on various types of computer-readable media, include information related to user profiles and/or to various documents. The information included in these data structures is arranged and stored in manner that allows for rapid user profile updating to be performed as new or changed documents are processed in a document filtering system.

25 Claims, 11 Drawing Sheets

216

| Terms in All Documents | Number of Documents Including Term |
|---|---|
| Dog | 56 |
| Tea | 46 |
| ... | ... |
| Jazz | 15 |

FIG. 8

FAST ADAPTIVE DOCUMENT FILTERING

BACKGROUND

Every day millions of electronic documents are created, edited, communicated, and stored. These electronic documents may range in complexity and format from simple text documents, web pages, and news articles, to complex and lengthy scholarly papers, technical literature, and electronic presentations. Most of these electronic documents are compiled in various electronic document repositories or databases. As will be appreciated, with the multitude of existing electronic documents, and with the constant creation of countless new and edited electronic documents, it is exceedingly difficult for a user to locate and access only those electronic documents that are relevant to the user's interests. As such, various mechanisms or systems have been devised to recognize, select, and deliver to a user, electronic documents that the user may find relevant.

One common system that is used for document selection and delivery is referred to as a text or document filtering system. In a document filtering system, each document coming into the system ("new document") is compared to a user profile that specifies an area or areas of interest of a user. If the new document compares favorably with the user profile, notice of the new document, or the document itself, is sent to the user. In this way, only those new documents that the user is likely to find relevant are delivered to the user.

The manner in which document filtering systems compare and match new documents and user profiles may vary. However, in a typical document filtering system, a new document is first parsed into a number of document terms. Each of these document terms is then assigned a weight based on information derived from the new document and information related to documents stored in a document database maintained or accessed by the document filtering system (the "document database"). These document terms and weights are then compared to profile terms and profile term weights contained in, or derived from, user profiles. In a typical system, the profile term weights indicate the relative importance of the terms in the profile in indicating the area or areas of interest of the user. Based on the comparison of the document terms and weights and the profile terms and weights, a document score is calculated that indicates how well the document terms match the terms of a user profile. If the calculated document score meets or exceeds a predetermined value associated with the user profile, the new document is then sent to the user ("sent document").

One variation of the typical document filtering system is what is commonly referred to as an adaptive document filtering system. In an adaptive document filtering system, a user profile may be changed or adapted automatically based on feedback from the user concerning previously received documents. For example, the user may provide feedback indicating that the user found a document to be particularly relevant. The adaptive document filtering system then uses that feedback, in conjunction with data related to documents stored in the document database, to change or update the user profile in some manner that will improve the adaptive document filtering system's ability to select and deliver relevant documents to the user.

As will be appreciated, the accuracy or effectiveness of an adaptive document filtering system is directly related to the accuracy and/or timeliness of the data used by the system in the profile updating process. As mentioned, adaptive filtering systems typically use information related to documents stored in the document database in the process of updating user profiles. In a typical adaptive document filtering system, the data related to documents stored in the document database is obtained from a document index structure. The document index structure typically provides a term based index into documents stored in the document database. Unfortunately, the process of updating the document index structure occurs only infrequently at various predetermined times. For example, an adaptive document filtering system may only update the document index structure every week or two. Since the profile updating process relies on data obtained from the document index structure, the process of updating individual user profiles is typically carried out in batch processes following the updating of the document index structure. As such, the user profiles in typical adaptive document filtering systems are often out-of-date.

The primary reason the updating of the document index structure, and thus the profile updating process, occurs so infrequently is due to the time and computational resources involved in the document index structure updating process. In a typical adaptive document filtering system, the document index structure is stored in a mass storage device, such as a disk drive(s), due to its large size. As will be appreciated, mass storage devices typically have relatively slow data access and transfer times compared to faster memory devices, such as system main memory or RAM. Due to these access time constraints, it is simply impractical to update the document index every time a new document is received by the system. Furthermore, due to the large size of the document index structure, it is likewise impractical to store the document index in relatively fast main memory, where it may be accessed more quickly.

One drawback associated with the infrequent updating of user profiles is that one or more documents that are deemed relevant by a user may not be accounted for in a user profile for some time. For example, a new document may be delivered to a user that includes terms that are relevant to the user, but which are not contained in the user's profile ("new terms"). This may occur, for example, when the new document includes terms that have not been previously seen by the user, or when a term has just recently become relevant to the user. In the case where the user provides feedback related to a document including new terms just after the profile updating process has occurred, the new terms will not be reflected or accounted for in the user's profile for some time. As such, documents including new terms that are received by the filtering system before the next profile updating process occurs may not be selected for delivery to the user.

SUMMARY

Described herein are various systems, methods and data structures that facilitate rapid updating of user profiles in a document filtering system. In accordance with one embodiment, a document filtering system creates a reference dictionary file in main memory. The reference dictionary file includes terms that are present in a document index structure stored in mass storage. Additionally, the reference dictionary file includes terms that are not included in the document index, but which are present in a new document being processed by the document filtering system. The reference dictionary file, and/or data structures that include information derived from the reference dictionary file, are then accessed by the document filtering system for use in updating user profiles.

BRIEF DESCRIPTION OF THE DRAWINGS

FIG. 8 illustrates one embodiment of a reference dictionary file data structure of the document filtering system illustrated in FIG. 2.

DETAILED DESCRIPTION

Figure 1:
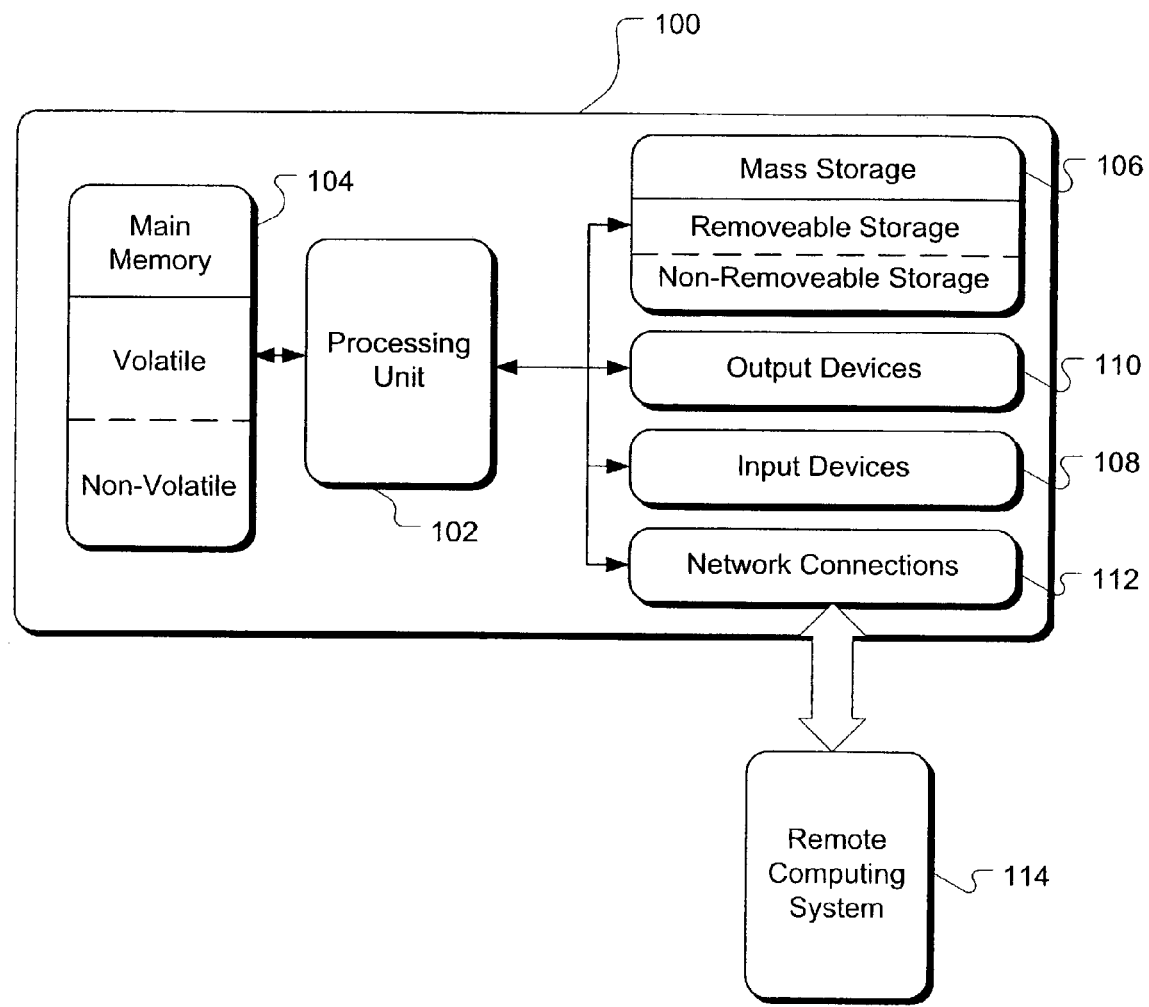
FIG. 1 illustrates one embodiment of a computing system in which a document filtering system may be implemented.

The following description sets forth various systems, methods, and data structures that may be used in, or in conjunction with, adaptive document filtering. The systems, methods, and data structures described herein incorporate various elements or operations recited in the appended claims. However, it should be understood that the following description is not intended to limit the scope of this patent. Rather, the inventors have contemplated that the claimed systems, methods, and data structures might also be embodied in other ways, to include different operations or elements, or combinations of operations or elements, similar to the ones described in this document, in conjunction with other present or future technologies.

In general, a document filtering system that may be used by or in conjunction with the various embodiments described herein is operable to receive new ("new documents") and to compare the new documents to user profiles stored in memory. As used herein, the term "new document" includes a document that is newly received by the document filtering system and/or document that is currently present or associated with the document filtering system, but which has been modified. Details regarding the manners in which new documents may be compared to user profiles in a document filtering system are set forth in detail below. However, it may be generally said that terms in the new document, and term weights associated with each term, are compared with terms and term weights in the user profiles to determine to what extent, if any, the terms of the new document conform to or match terms in the user profiles. If it is determined by the document filtering system that the terms of a new document sufficiently match the terms of a given user profile, the new document, or a message identifying the new document, is then sent by the document filtering system to the user associated with the given user profile. As used herein, the phrase "sent document" denotes either a document that is sent to a user, or an indication or notification of the document that is sent to the user. Furthermore, the phrase "sent document" may refer to a single document that is sent to the user or multiple of documents that are sent in a group to the user.

After the sent document has been received and reviewed by the user, the user may then provide some sort of feedback to the document filtering system regarding the sent document. This document feedback may be provided directly to the document filtering system by the user, such as by a simple indication that the user finds the sent document relevant, or by a more sophisticated ranking or scoring of the sent document. Alternatively, feedback regarding the sent document may be provided indirectly to the document filtering system by the user. For example, the document filtering system may infer the relevance of the sent document to the user based on various actions the user performs in response to receiving the sent document.

Having received feedback from the user regarding the sent document, the document filtering system may then update or modify the profile or profiles of the user who provided the feedback, based on that feedback. As previously noted, for various reasons, a typical document filtering system only performs profile updating infrequently. As such, typical document filtering systems may not incorporate, and take advantage of, user feedback in the document filtering system in a timely manner. In this regard, various systems, methods and data structures will now be described that allow for frequent and rapid updating of user profiles.

FIG. 1 illustrates one exemplary computing system 100 in which an adaptive document filtering system may be implemented. In its most basic configuration, the computing system 100 includes a processing unit 102 and main memory 104. Additionally, the computing system 100 may include or have access to various mass storage devices or systems 106. Additionally, in the case where the mass storage device comprises a number of storage devices, those devices may be distributed, such as across a computer network.

It will be appreciated that main memory 104 may be distinguished from mass storage 106 in a number of ways. For example main memory typically comprises one or more semiconductor-based devices, such as RAM, ROM, NVRAM, Flash Memory, or the like. In contrast, mass storage typically comprises magnetic or optical based data storage devices, such as magnetic optical disk drives, or magneto-optical type disk drives.

The computing system 100 may have various input devices 108, such as a keyboard, a pointing device (mouse), various optical scanners or readers. The computing system 100 may also have various output devices 110, such as display devices or printers, etc. Other aspects of the computing system 100 may include network or communications connections 112 to other devices, computers, networks, servers, etc., using either wired or wireless computer-readable media. For example, the computing system 100 is shown in FIG. 1 as being connected to a remote computing system 114, such as a remote user's computing system. It will be appreciated that the remote computing system 114 may encompass various computing systems or computing processes. For example, in one implementation, the remote computing system 114 is similar in basic structure and features to the computing system 100.

Figure 2:
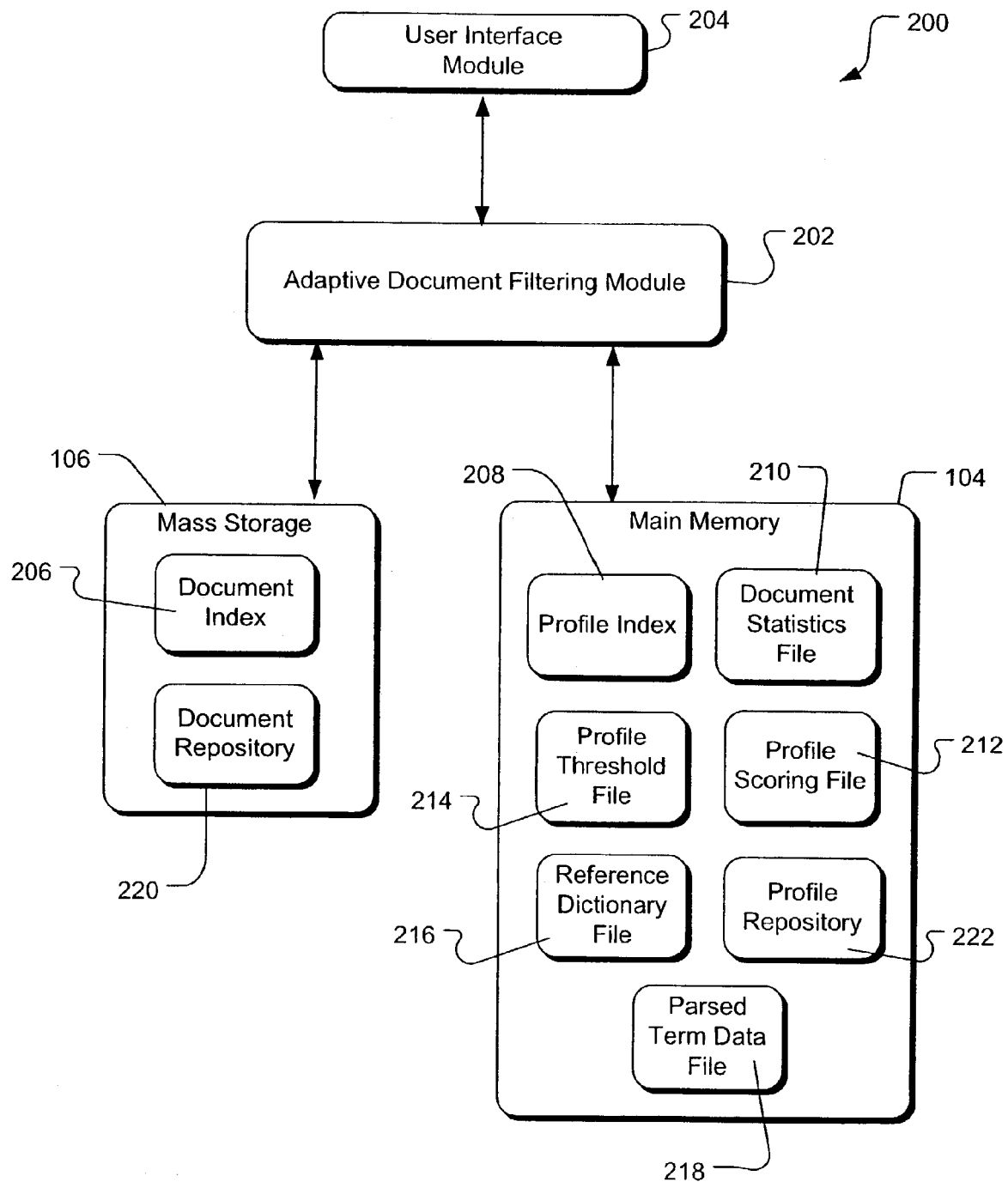
FIG. 2 illustrates one embodiment of a document filtering system.

FIG. 2 illustrates an exemplary embodiment of an adaptive document filtering system 200 (the "filtering system"). The filtering system 200 includes an adaptive document filtering module ("filtering module") 202, a user interface module 204, various data structures 206, 208, 210, 212, 214, 216, and 218, and various databases 220 and 222. As shown in FIG. 2, the data structures and databases are stored variously in the main memory 104 and the mass storage 106 illustrated in FIG. 1.

In one implementation, the filtering module 202 and the user interface module 204 are composed of computer executable instructions that are stored or embodied in one or more types of computer-readable media. As used herein, computer-readable media may be any available media that can store and/or embody computer executable instructions and that may be accessed by a computing system or computing process. Computer-readable-media may include, without limitation, both volatile and nonvolatile media, removable and non-removable media, and modulated data signals. The term "modulated data signal" refers to a signal that has one or more of its characteristics set or changed in such a manner as to encode information in the signal.

Generally, the modules 202 and 204 may include various routines, programs, objects, components, data structures, etc., that perform particular tasks or operations or implement particular abstract data types. For example, in one implementation the filtering module performs the operations illustrated in FIGS. 10 and 11 and maintains the various data structures 206, 208, 210, 212, 214, 216, and 218, and databases 220 and 222.

Either of the modules 202 and 204 may be executed or implemented in a single computing device or in a distributed computing environment, where tasks are performed by remote processing devices or systems that are linked through a communications network. For example, in accordance with one embodiment, the filtering module 202 is executed or implemented in the computing system 100, while the user interface module is executed or implemented in the remote computing system 114.

It should be understood that while the program modules 202 and 204 are described herein as comprising computer executable instructions embodied in computer-readable media, the program modules 202 and 204, and any or all of the functions or operations performed thereby, may likewise be embodied all or in part as interconnected machine logic circuits or circuit modules within a computing device. Stated another way, it is contemplated that the program modules 202 and 204 and their operations and functions, such as the operations shown and described with respect to FIGS. 10 and 11, may be implemented as hardware, software, firmware, or various combinations of hardware, software, and firmware. The implementation is a matter of choice dependent on performance requirements of the adaptive document filtering system 200.

As previously described, in accordance with one embodiment, the data structures and databases are stored variously in the main memory 104 and the mass storage 106 illustrated in FIG. 1. In particular, in one embodiment, the document repository 220 is stored in mass storage 106, while the user profile repository 222 is stored in the main memory 104. In this embodiment, the document repository 220 serves as a primary store or database for documents in the adaptive document filtering system 100. The user profile repository 222 serves as a primary store for current user profiles and for the history of the current user profiles.

Included in the various data structures are a document index 206, a profile index 208, a document statistics file 210, a profile scoring file 212, a profile threshold file 214, a reference dictionary file 216, and a parsed term data file 218. In accordance with one embodiment, the document index 206 is stored in mass storage 106, while the profile index 208, document statistics file 210, profile scoring file 212, profile threshold file 214, reference dictionary file 216, and parsed term data file 218 are each stored in main memory 108. As described in greater detail below, by storing the profile index 208, document statistics file 210, profile scoring file 212, profile threshold file 214, reference dictionary file 216, and parsed term data file 218 in the main memory 104, faster document filtering may be obtained than if these structures were stored in mass storage 106. Additionally, by storing the reference dictionary file 216 and parsed term data file 218 in the main memory 104, exceptionally fast and accurate profile adaptation or updating may be achieved by the adaptive document filtering system 200.

Figure 3:
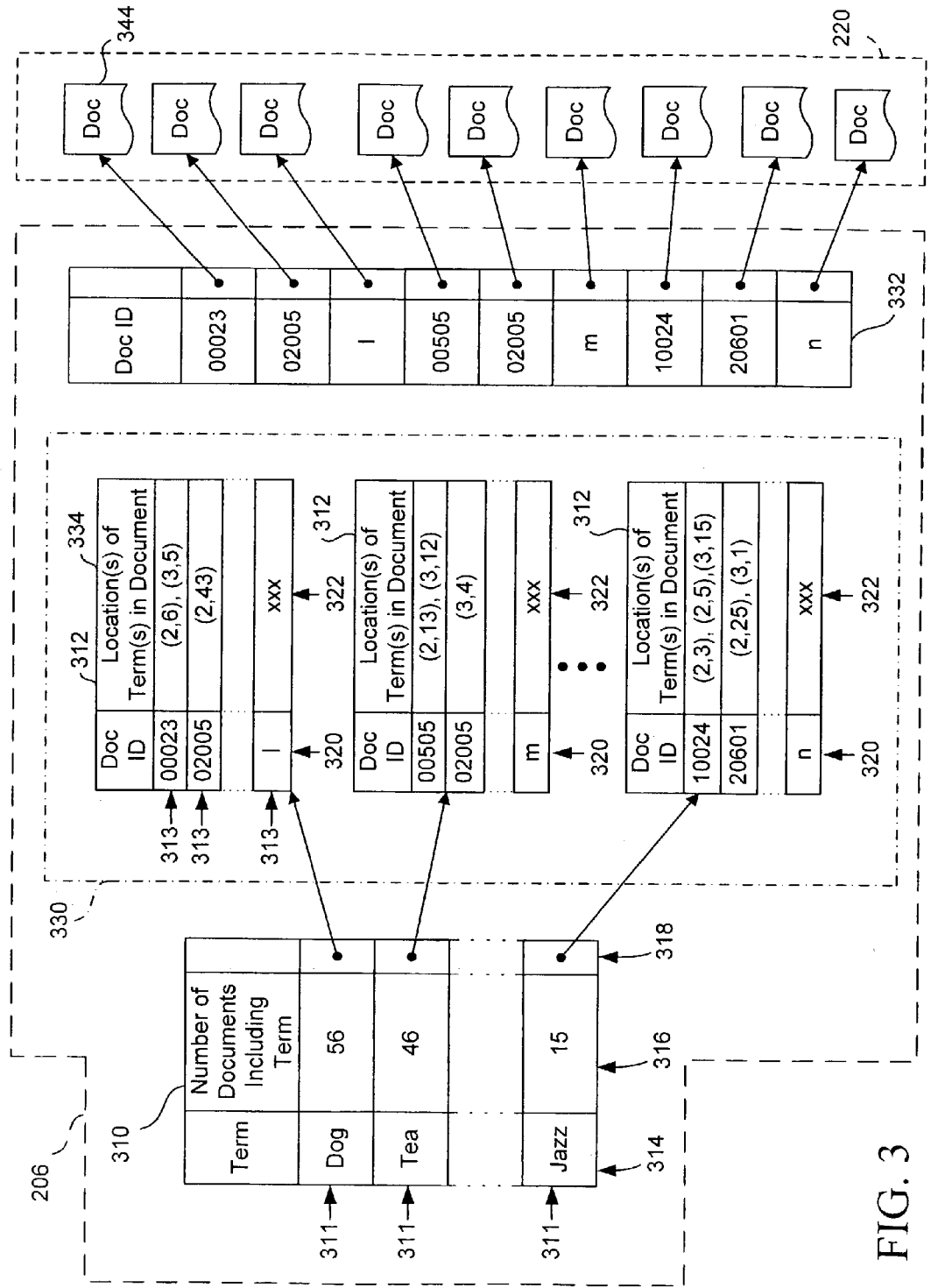
FIG. 3 illustrates one embodiment of a document index data structure of the document filtering system illustrated in FIG. 2.

Before describing operations performed by the modules 202 and 204 of the adaptive document filtering system 200, the basic arrangement and function of each of the various data structures will first be described with respect to FIGS. 3-9. Turning first to FIG. 3, illustrated therein is one embodiment of the document index 206. In general, the document index 206 servers as a term based index into each of the documents stored in the document repository 220. That is, given a particular term, each document in the document repository that includes the term, as well as the location of the term in the documents, can be quickly determined.

In accordance with this embodiment, the document index 206 is a data structure that includes a document dictionary index data structure 310, an inverted index data structure 330, and a document association array 332. As shown, the inverted index data structure 330 includes a number of posting lists 312. In general, the document dictionary index 310 includes information about documents stored in the document repository 220. In particular, the document dictionary index 310 includes a number of document term records 311, each of which is associated with a term that is present in the documents stored in the document repository 220 (a "document term"). The document dictionary index 310 may not include document term records 311 for every document term in every document in the document repository 220. For example, the document dictionary index 310 may not include document term records 311 for very common document terms, sometimes referred to as stopwords.

Included in each document term record 311 are a document term field 314, a document count field 316, and a posting list reference field 318. The document term field 314 stores the document term with which the document term record 311 is associated. The document term is stored in the document term field 314 either as a string or as a term identifier number. As used herein, a "term" may be a single word, a group of words (phrasal group), or a morphologically standardized word, for example a noun in singular form where the document uses the plural form. As will be appreciated, other ways of defining and identifying document terms may also be employed.

The document count field 316 stores a value indicative of the number of documents in the document repository 220 that include the document term associated with term record 311. The posting list reference field 318 stores a reference, such as a pointer or address, specifying the location in the mass storage 106 of a posting list 312 associated with the term record 311. Each document term in the document dictionary index 310 is associated with a single posting list 312.

As previously noted, the inverted index 330 includes a number of posting lists 312. In turn, each posting list 330 includes a number of document records 313. Included in each document record 313 are a document identifier field 320 and a document term locator field 322. The document identifier field 320 stores a document identifier that specifies a document with which the document record 313 is associated. The document term locator field 322 stores the location or locations within the document specified by the document identifier of the document term with which the posting list 312, and thus the document record 313, is associated.

There are a number of ways in which the location of a term in a document may be represented in a term locator field 322. The precise format of term location information may depend on the format of documents in the database. For example, and without limitation, if a document generally possesses a title, an abstract and a text body, a location may specify one of these three fields and a word-count position within the field.

As shown in FIG. 3, the document association array 332 includes a number of document identification fields 340 and a number of document reference fields 342. Each document identification fields 340 stores a single document identifier. Each posting list reference field 342 stores a reference, such as a pointer or address, specifying the location in the mass storage 106 of the document identified by the document identifier stored in the document identification field associated with the posting list reference field 342.

For ease of understanding, a specific example of the associations of the various elements of the document index 206 will now be provided. As shown in FIG. 3, the document dictionary index 310 includes the document term "dog." Associated with the term dog in the document dictionary index is the number "56," which indicates that there are 56 documents in the document repository 220 including the term dog. Also associated with the term dog is a pointer pointing to the posting list 312 associated with the term dog. Within the posting list associated with the term dog are a number of document identifiers 320, each of which identifies a single document in the document repository 220 including at least one occurrence of the term dog. In particular, the associated posting list includes the document identifier "00023." Associated with the document identifier 00023 are a number of term locators, (2, 6) and (3, 5). The document identifier may be used in conjunction with the document association array 332 to locate in the document repository 220 the document 344 identified by the document identifier 00023. The term identifiers (2, 6) and (3, 5) indicate the locations of the term dog within the document 344. In particular, the term identifiers indicate that the word dog occurs in document 344 once at word-count 6 in field 2, and once at word-count 5 in field 3.

Figure 4:
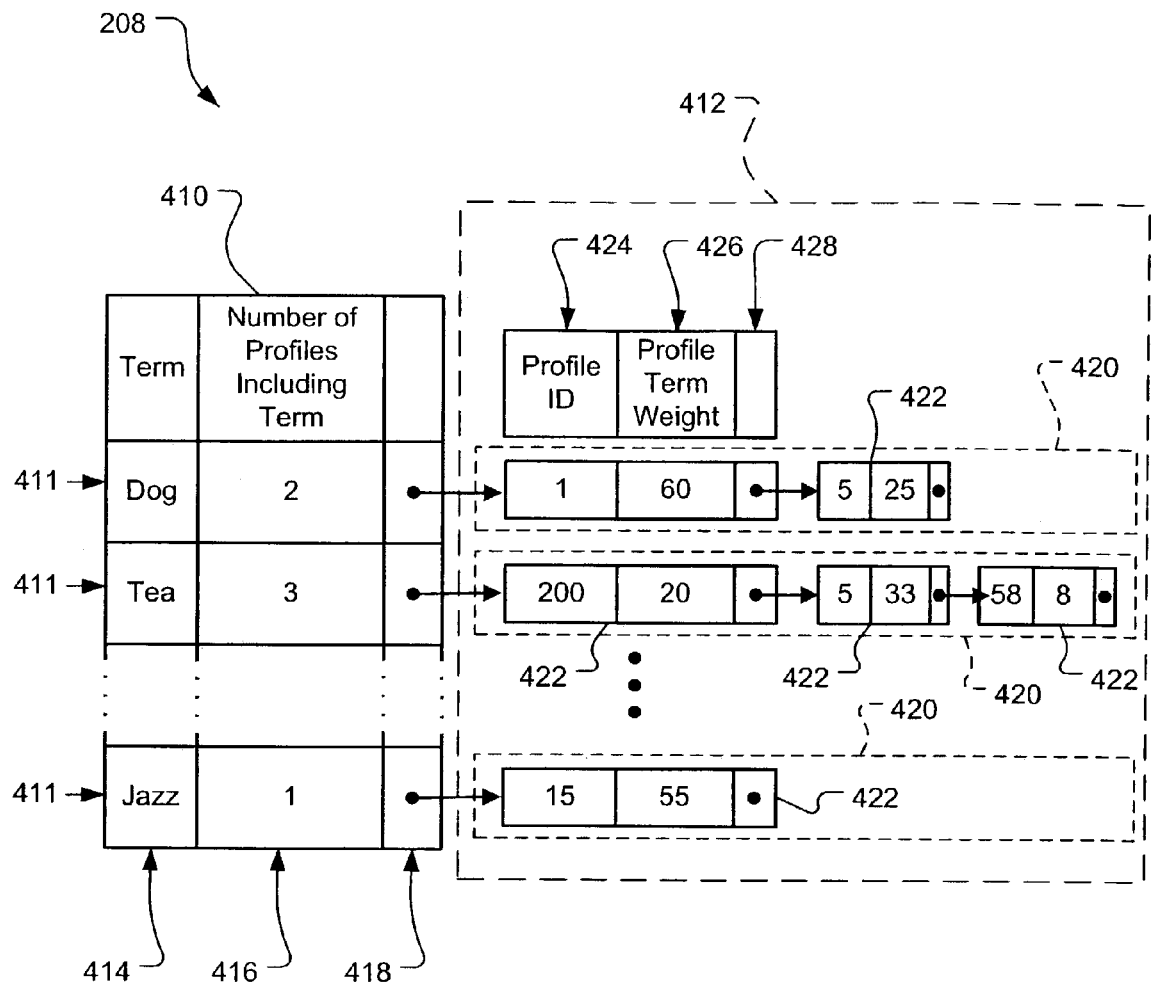
FIG. 4 illustrates one embodiment of a profile index data structure of the document filtering system illustrated in FIG. 2.

FIG. 4 illustrates one embodiment of the profile index 208. In general, the profile index 208 serves as a term based index into a plurality of profile record lists 420. Additionally, the profile index 208 includes information about profiles, and terms contained within the profiles ("profile terms"). As shown in FIG. 4, the profile index 208 is a data structure that includes a profile dictionary index data structure 410 and a collection 412 of profile record list data structures 420. The profile dictionary index 410 includes a number of profile term records 411. Each profile term record is associated with a single term that is located in a user profile stored in the profile repository 222. The profile dictionary index 410 will not typically include a profile term record 411 for every profile term in the profiles in the profile repository 222. For example, the profile dictionary index 410 will not typically include profile term records 411 for very common profile terms, sometimes referred to as stopwords.

Included in each profile term record 411 are a profile term field 414, a profile count field 416, and a profile record list reference field 418. The profile term field 414 stores the profile term with which the profile term record 411 is associated. The profile term may be stored in the profile term field 414 either as a string or as a profile term identifier number. The profile count field 416 stores a value indicative of the number of profile records in the profile record list 420 associated with the profile term record 411. The profile record list reference field 418 stores a reference, such as a pointer or address, specifying the location in the main memory 104 of the profile record list 420 associated with the profile term record 411. As such, each profile term in the profile dictionary index 410 is associated with a single profile record list 420 and a single profile count value, where the profile count value specifies the number of profile records in the associated profile record list 420.

Each profile record list 420 includes one or more associated profile records 422. Each profile record 422 includes a profile identifier field 424 and a profile term weight field 426, and a profile record identifier 428. The profile identifier field 424 stores a profile identifier uniquely identifying an associated user profile record in the user profile repository 222. Each profile record 422 is associated with a single user profile stored in the profile repository 222. The profile term weight field 426 stores a weighting value indicative of the value that the profile term with which the profile record is associated has within the user profile associated with the profile record 422. That is, a profile term weight 426 indicates the weight of a profile term within the user profile that is associated with the profile record.

Each profile record 422 also includes a profile record reference field 428. The profile record reference field 428 stores a reference, such as a pointer or address, specifying the location in the main memory 104 of an associated profile record. In particular, in the embodiment shown in FIG. 4, the profile records 422 in a profile record list 420 are associated in a linked list structure. More particularly, in the embodiment shown, the profile records 422 in a profile record list 420 are associated in a singly-linked list of profile records. Arranged in this manner, each pointer 418 in the profile dictionary index 410 points to a first profile record 422 (the head record) in a profile record list 420. The first profile record 422, in turn, points to another profile record 422 in a profile record list 420, and so on until a last profile record 422 (the tail record) in profile record list 420 is reached. It will be appreciated that in the case where the profile record list includes only one profile record, the tail profile record will also be the head profile record.

It should be understood that although the profile records shown in FIG. 4 as having the form of a linked list, the various profile records, in other embodiments, the profile term records may be associated in other ways. For example, in one alternative embodiment, the profile records are associated as elements in a variable-length array. Other associations of the profile records may also be used, as will be appreciated by those skilled in the art.

Figure 5:
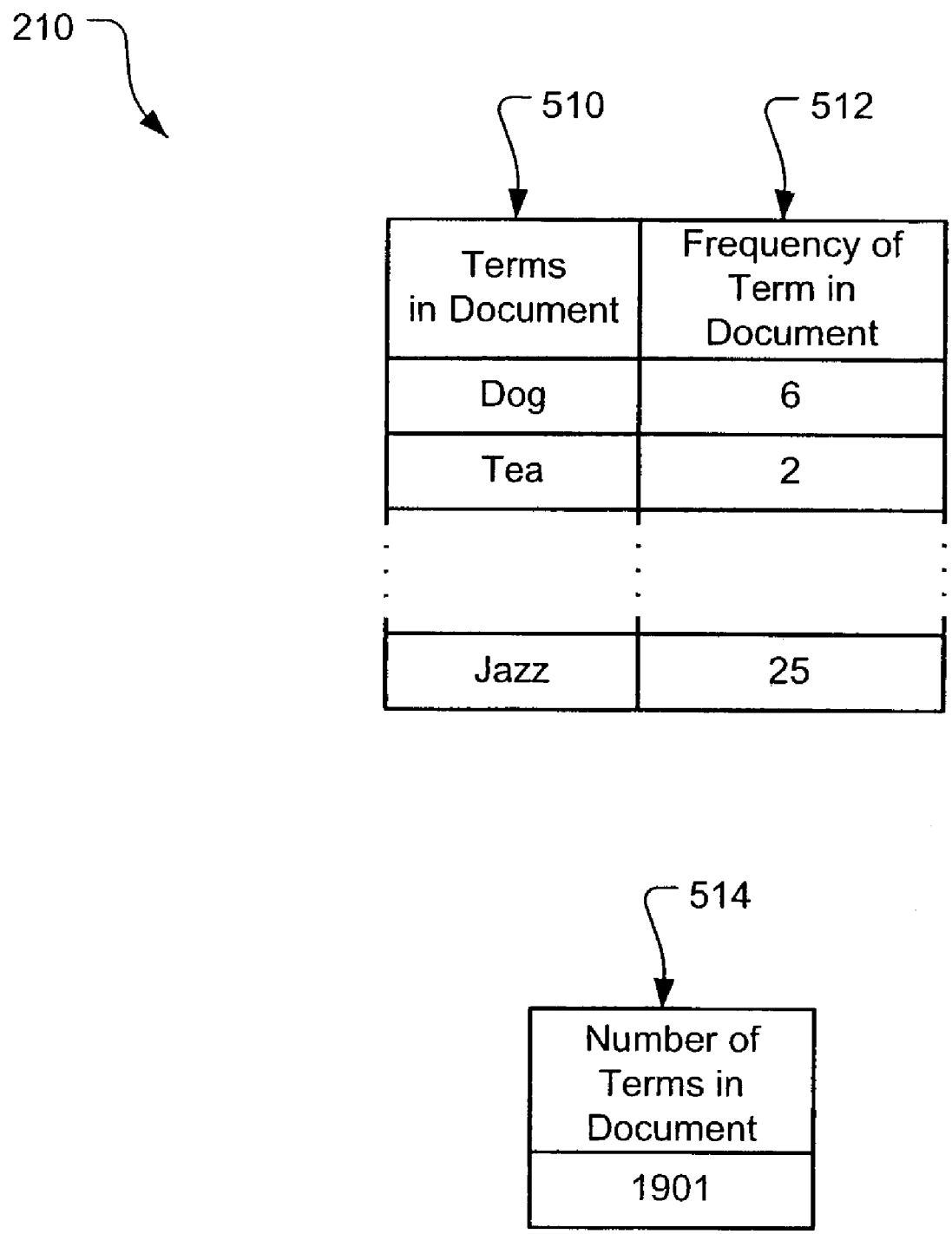
FIG. 5 illustrates one embodiment of a document statistics file data structure of the document filtering system illustrated in FIG. 2.

FIG. 5 illustrates one embodiment of the document statistics file 210. In general, the document statistics file 210 includes information about the terms of a new document being processed by the filtering system 200. As described in greater detail below, a document statistics file 210 is created in the main memory 104 for each new document that is processed by the adaptive document filtering system 200. As such, each document statistics file 210 is associated with a single new document. As described below, the information contained in the document statistics file 210 is used in the profile updating process.

Included in each document statistics file 210 are a number of document term fields 510, a number of term frequency fields 512, and statistics a document size field 514. As shown, each term field 510 is associated with a single term frequency field 512. Each term field 510 stores a term that is present in the new document associated with the document statistics file 210. The terms may be stored in the term fields 510 either as strings or as a term identifier numbers. The document statistics file 210 will typically not include term fields for all of the terms in its associated new document. For example, the document statistics file will typically not include term fields for stopwords. Each term frequency field 512 stores a term frequency value indicating the number of times the term stored in its associated term field is included in the new document associated with the document statistics file 210.

As noted, the document statistics file 210 also includes a document size indicator field 514. The document size indicator field 514 stores a document size indicator value indicative of the overall size or length of the new document associated with the document statistics file 210. The document size indicator value may indicate the size of the new document in a number of ways. For example, in the embodiment shown in FIG. 5, the document size indicator value specifies the number of words in the document associated with the document statistics file 210. In other embodiments, the document size indicator value may specify the size of the new document in other ways.

Figure 6:
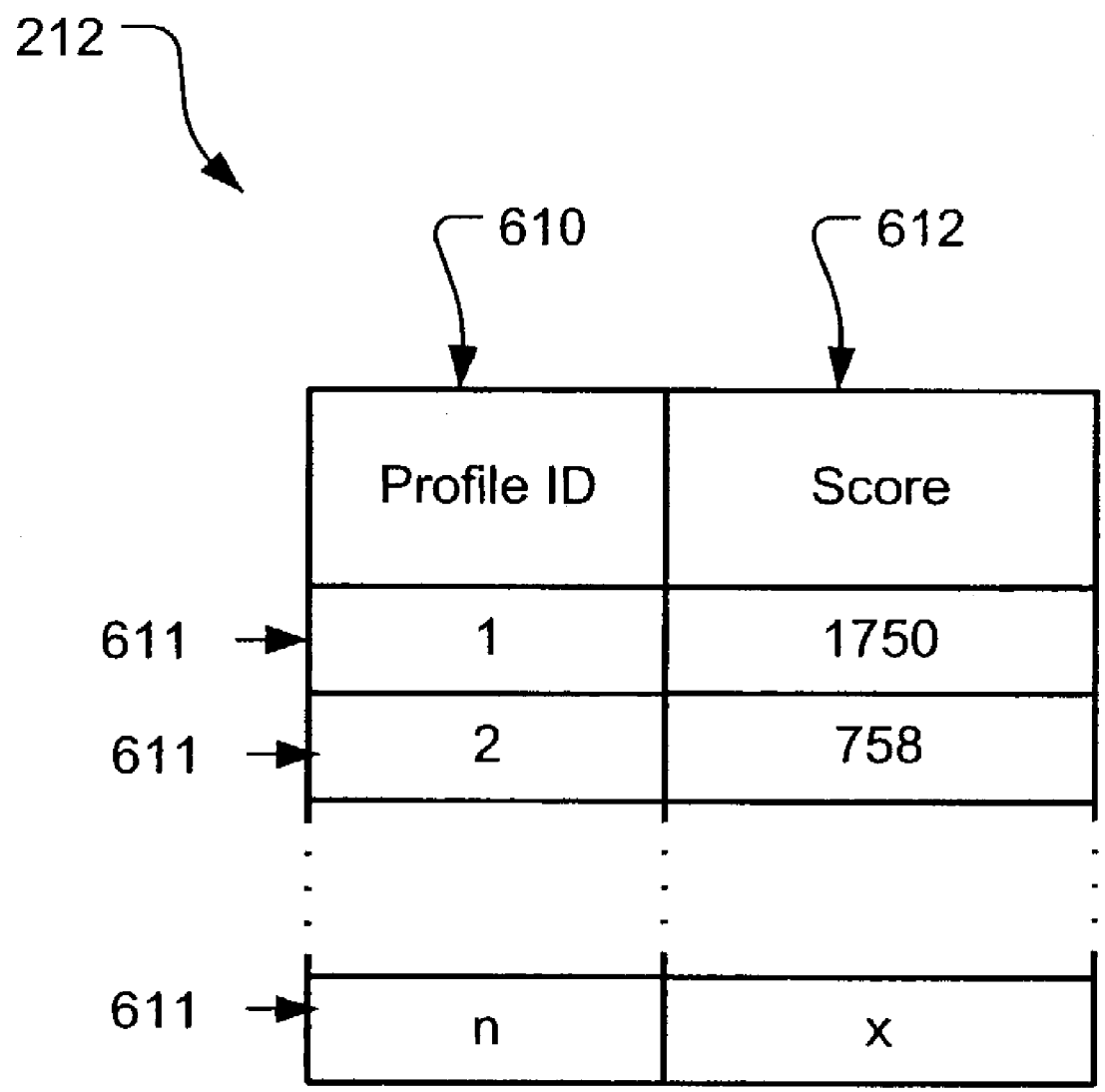
FIG. 6 illustrates one embodiment of profile scoring file data structure of the document filtering system illustrated in FIG. 2.

FIG. 6 illustrates one embodiment of the profile scoring file 212. In general, the profile scoring file 212 includes information that is used by the filtering process in determining whether a new or changed document matches a user profile. As described in greater detail below, a profile scoring file 212 is temporarily created in the main memory 104 for each new document that is processed by the adaptive document filtering system 200. As such, each profile scoring file 212 is associated with a single document. As shown, the profile scoring file 212 includes a number of profile scoring records 611. Included in each profile scoring record 611 are a profile identifier field 610 and a profile score field 612. Each profile scoring record 611 is associated with a single user profile. The profile identifier field 610 stores a profile identifier uniquely identifying the user profile associated with the profile scoring record 611. The profile score field 612 stores a score that, as described below, indicates how well the terms in the document associated with the profile scoring file 212 match the terms in the user profile associated with the profile scoring record 611.

Figure 7:
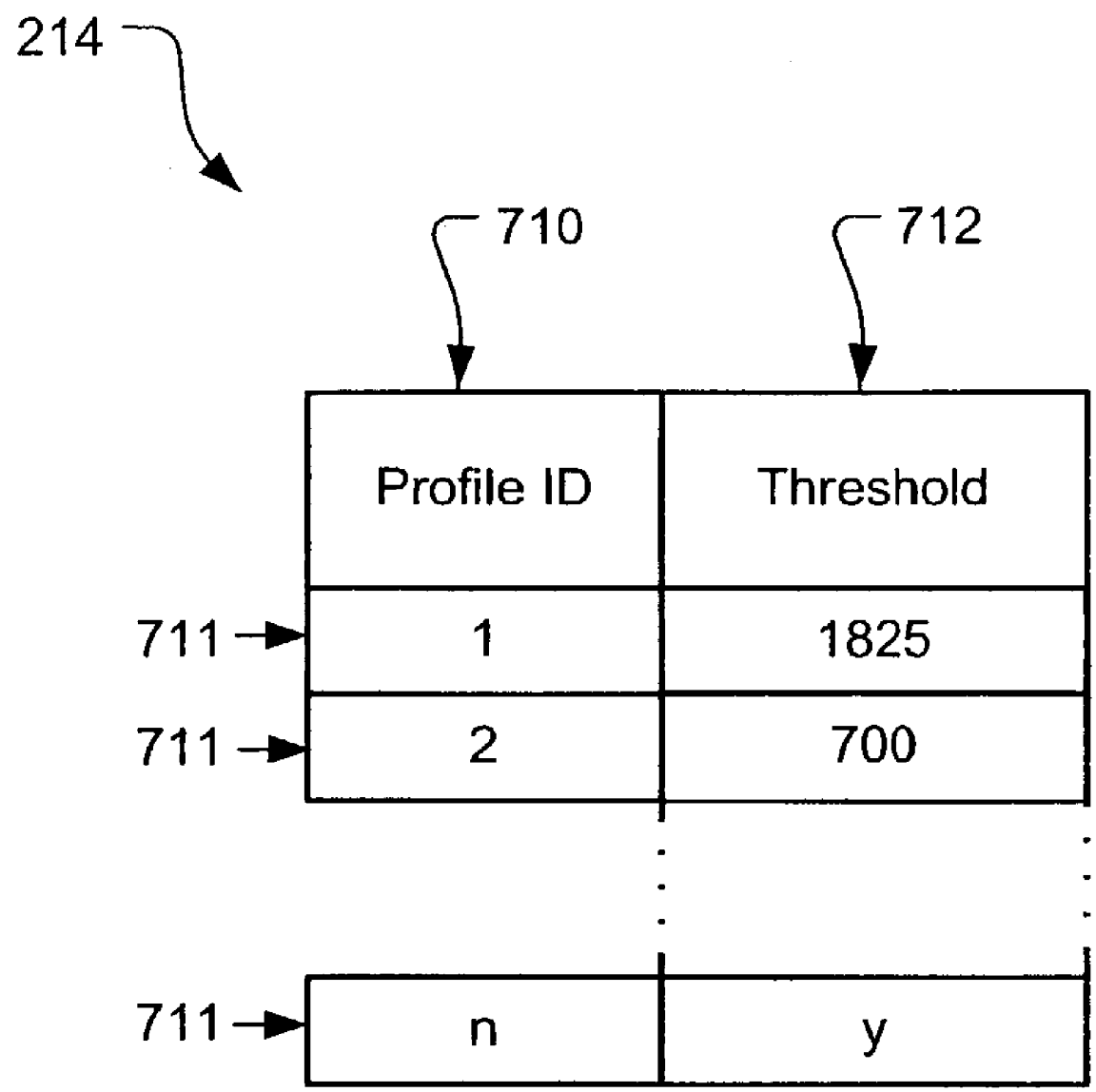
FIG. 7 illustrates one embodiment of profile threshold file data structure of the document filtering system illustrated in FIG. 2.

FIG. 7 illustrates one embodiment of the profile threshold file 214. In general, the profile threshold file 214 includes information that is used by the filtering process in determining whether a new document matches a user profile. The profile threshold file 214 is created and may be stored in the main memory 104. As shown, the profile threshold file 214 includes a number of profile threshold records 711. Included in each profile threshold record 711 are a profile identifier field 710 and a profile threshold field 712. Each profile threshold file 214 is associated with a single user profile. The profile identifier field 710 stores a profile identifier uniquely identifying the user profile associated with the profile scoring threshold 711. The profile threshold field 712 stores a predetermined profile threshold value. As described in greater detail below, in the adaptive document filtering process, a profile score stored in a profile score field 612 (FIG. 6) for a given profile is compared to a corresponding profile threshold value stored in a profile threshold field 712 (FIG. 7) for the given profile in order to assess the relevance of the documents associated with the profile scoring file 212 to the user profile associated with the profile scoring record 611.

FIG. 8 illustrates one embodiment of the reference dictionary file 216. The reference dictionary file 216 includes information about documents stored in the document repository 220. The reference dictionary file 216 includes a similar basic field structure and arrangement as the document dictionary index 310. However, unlike the document dictionary index 310, the reference dictionary file 216 does not include posting list reference fields. Additionally, as described in detail below, the reference dictionary file 216 may include information about new documents that have been received by the filtering systems 200, but which have not yet been added to the document repository 220. As such, the reference dictionary file 216 may include information about documents that is not included in the document dictionary index 310. For this reason, the reference dictionary file 216 may often be more up-to-date, and thus more useful in updating user profiles, than the document dictionary index 310. Additionally, since the reference dictionary file 216 is stored in main memory, rather than in mass storage, the reference dictionary file 216 is also more quickly accessible than the document dictionary index 310.

The reference dictionary file 216 includes a number of reference term records 811. Included in each reference term record 811 are a reference term field 810 and a reference count field 812. The reference term field 810 stores the reference term with which the reference term record 811 is associated. The reference term may be stored in the reference term field 810 either as a string or as a term identifier number. The reference count field 812 stores a reference count value indicative of the number of documents, either in the document repository 220 or received by the filtering systems 200 and not yet added to the document repository 220, that include the reference term associated with the reference term record 811.

Figure 9:
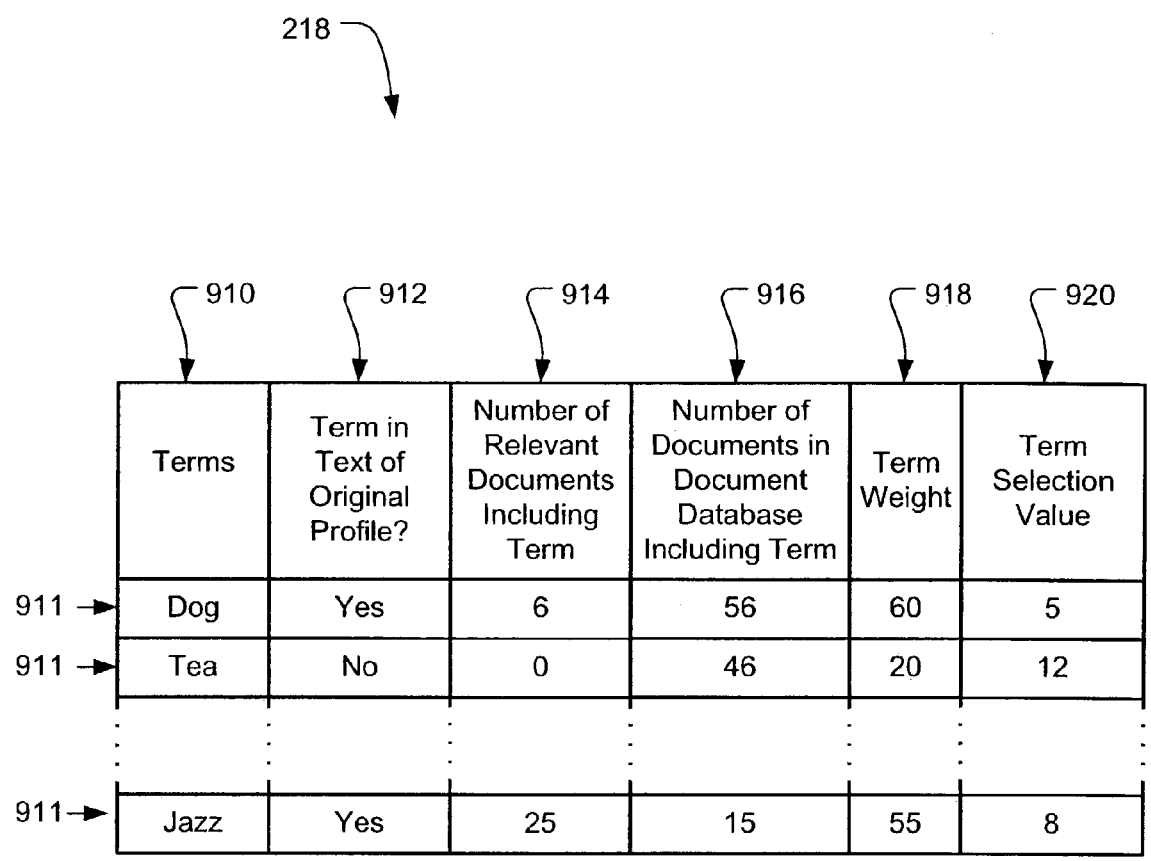
FIG. 9 illustrates one embodiment of a parsed term data structure of the document filtering system illustrated in FIG. 2.

FIG. 9 illustrates one embodiment of the parsed data file 218. The parsed term data file 218 is created and stored in the main memory 104. In general, the parsed term data file 218 includes information that is used in user profile updating process described below with respect to FIG. 11. In this profile updating process, a user profile, referred to as an original user profile, is modified based on various operations and information to produce an updated user profile. The particular information contained in the parsed data file 218, together with the storage of the parsed data file 218 in main memory, allow for rapid updating of user profiles in the user profile updating process.

The parsed term data file includes a number of parsed term data records 911. Included in each parsed term data record 911 are a parsed term field 910, an original profile term field 912, a relevant document frequency field 914, a document repository frequency field 916, a term weight field 918, and a term selection value field 920. The parsed term field 910 stores the parsed term with which the parsed term data record 911 is associated. As described below, each parsed term in the parsed term data file is either present in one of a number of documents that have been indicated as relevant by a user, or is present in an 11 original user profile. The parsed term may be stored in the parsed term field 910 either as a string or as a term identifier number. Each of the remaining fields 912, 914, 916, 918, and 920, in a parsed term data record 911, and the information contained within these fields, may be said to be associated with the term stored in the parsed term field 910 of the parsed term record 911.

The original profile term field 912 stores an indicator that specifies whether its associated parsed term is present in the original user profile. The relevant document frequency field 914 stores an indicator that specifies the number of relevant documents that include its associated parsed term. The document repository frequency field 916 stores an indicator that specifies the number of documents in the document repository 220 that include its associated parsed term. The term weight field 918 stores a new weighting value that is calculated for its associated parsed term based on, among other things, information stored in the other fields of the parsed term record 911. The term selection value field stores a term selection value that is calculated for its associated parsed term based on, among other things, information stored in the other fields of the parsed term record 911. The manner in which the new weighting value and the term selection value may be calculated is discussed in greater detail below with respect to FIG. 11.

Having generally described the basic arrangement and function of each of the various data structures, the operation of the user interface module 204 and the filtering module 202 will now be described. In accordance with one implementation, the user interface module 204 is a graphical user interface (GUI) program running on a remote computing system, such as the remote computing system 114 illustrated in FIG. 1. In general, the user interface module 204 provides a mechanism by which a user of the remote computing system 114 accesses and communicates with the adaptive document filtering module 202. More particularly, in accordance with one embodiment, the user interface module 204 is, or includes, a graphical user interface. In various implementations, the user interface module 204 may receive and present to a user new documents sent to the user from the document filtering module 202. Additionally, the user interface module 204 may provide a mechanism by which a user can inform the document filtering module 202 of a perceived relevance of a document. The user interface module may also provide a mechanism by which the document filtering module 202 may determine a user's reactions to, or interactions with, documents that were sent to the user from the document filtering module 202. It should be understood, that while only one user interface module is illustrated in FIG. 2, the adaptive document filtering system 200 may include any number of user interface modules.

Figure 10:
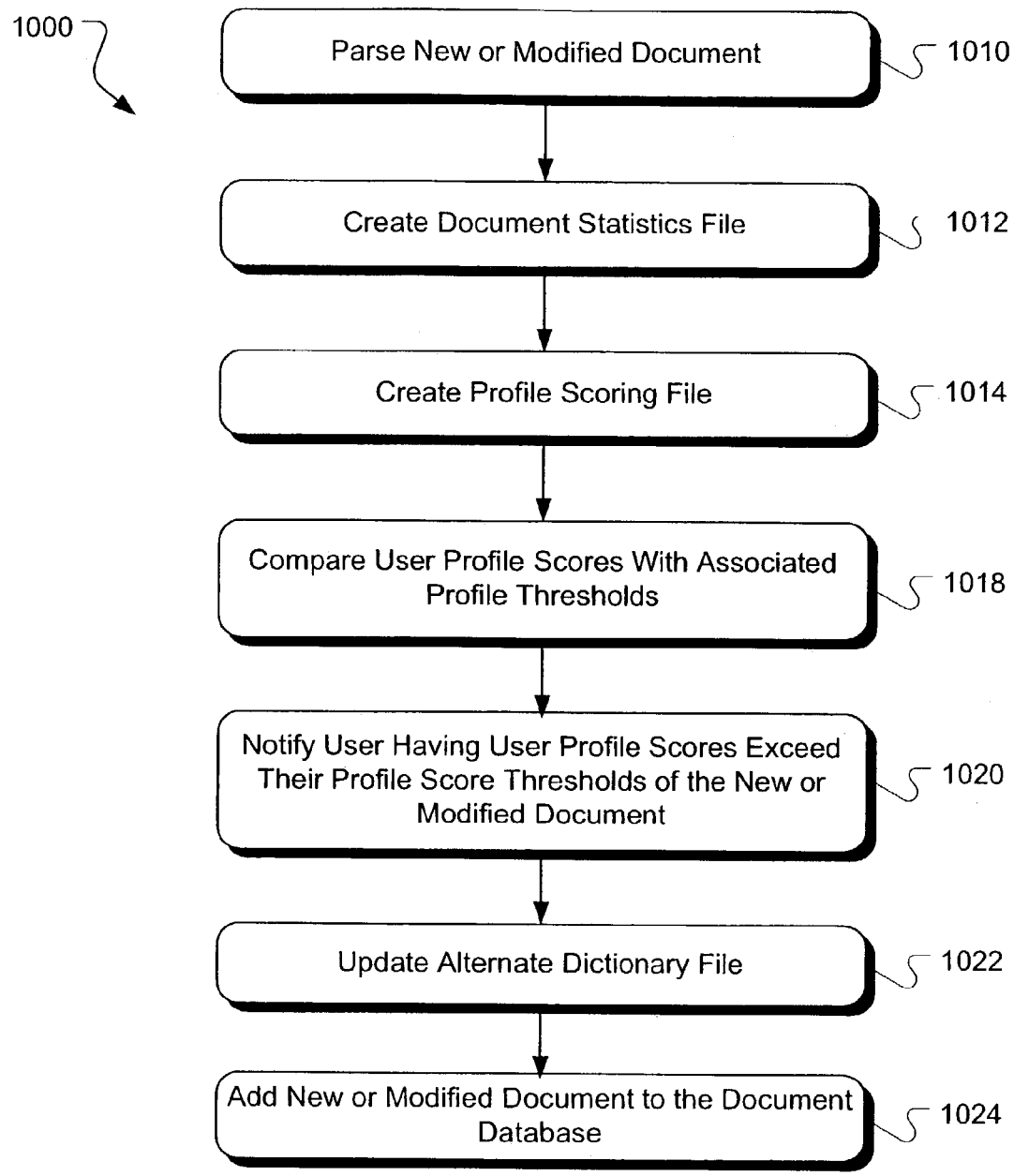
FIG. 10 illustrates operations for handling new documents in the document filtering system illustrated in FIG. 2 in accordance with one embodiment.

Turning now to FIG. 10, illustrated therein is an operational flow 1000 including operations that may be performed, all or in part, by the filtering module 202 when a new document is received by the filtering module 202. As shown, when a new document is received or detected by the filtering module 202, a parsing operation 1010 parses the new document into one or more document terms. The parsing operation 1010 may include a number of features or operations designed to aid in the identification of suitable terms for indexing. In particular, in accordance with one embodiment, the parsing operation 1010 may include, without limitation, any or all of the following: identification of individual words, identification of stopwords by reference to a predetermined list, identification of phrases by reference to a predetermined list, syntactic analysis for identifying phrases that have not been predetermined, suffix-stripping or stemming of words to identify the morphological root or a morphologically standardized form, mapping onto synonyms by reference to a predetermined dictionary.

Following the parsing operation 1010, a document statistics file creation operation 1012 constructs in main memory 104 a document statistics file 210 using information obtained in the parsing operation 1010. In accordance with one embodiment, the document statistics file creation operation 1012 creates a document statistics file 210 having the form described above with respect to FIG. 5.

Next, a profile scoring file creation operation 1014 constructs in main memory 104 a profile scoring file 212. In accordance with one embodiment, the profile scoring file 212 has the form described above with respect to FIG. 6. In creating the profile scoring file 212, the profile scoring file creation operation 1014 first locates in the profile dictionary index 410 any term that is present in the document statistics file 210. Any term that is present in the document statistics file 210, but not in the profile dictionary index 410, is ignored. Next, a profile score is calculated for each profile. In general, the profile score for each profile is 11 calculated based on the terms in the new document that are also associated with the profile in the profile dictionary index 410. More particularly, for each term in a profile, a term score is calculated based on the weight of the term in the profile, the frequency of the term in the new document, and the length of the new document. The weight of the term in the profile is determined from the profile record associated with the profile in the profile dictionary index. The frequency of the term in the new document and the length of the new document are determined from the document statistics file 210. After calculating the term scores for term in a given user profile, the term scores are then added and the resulting value is stored in the profile score field 612 of the profile score file 212 that is associated with the given profile.

The calculation or determination of the profile scores in the profile scoring file creation operation 1014 may be carried out using a number of different operations or algorithms. For example, and without limitation, in one embodiment, the profile scores are determined using the BM25 scoring function. (K. Sparck Jones, S. Walker and S. E. Robertson, "A probabilistic model of information retrieval: development and comparative experiments," Information Processing and Management 36, Part 1 779-808; Part 2 809-840 (2000)). In another embodiment, the profile scores are determined using a cosine correlation function. In yet other embodiments, the profile scores may be determined using other scoring functions or algorithms.

Following the creation operation 1014, a compare operation 1018 compares the profile score associated with each profile in the profile score file 212 with a profile score threshold value stored in a profile threshold file. In accordance with one embodiment, the profile threshold file 214 has the form of the profile threshold file 214 described above with respect to FIG. 7. Each profile having a profile score greater than its associated profile threshold score is then noted. Next, for each profile having a profile score greater than its profile threshold score, the user associated with that user profile is notified of the new document by a user notification operation 1020. Each user may be notified either by sending the new document to the user, or by sending a notification of the new or used document to the user.

Next, an update operation 1022 updates a reference dictionary file. In accordance with one embodiment, the reference dictionary file 216 has the form of the reference dictionary file described above with respect to FIG. 8. In updating the reference dictionary file 216, the update operation 1022 first determines which terms are present in both the document statistics file 210 and the reference dictionary file 216. For each term that is included both in the document statistics file 210 and in the reference dictionary file 216, the count value associated with that term in the reference dictionary file 216 is incremented. When a term is located in the document statistics file 210, but not in the reference dictionary file 216, that term, as well as an associated memory count value, is added to the reference dictionary file 216. Additionally, the memory count value associated with the added term in the reference dictionary file 216 is initialized to 1.

Next, a document add operation 1024 adds the new document to a document repository 220 in mass storage 106. While the update operation 1022 and the document add operation 1024 are shown in the operational flow 900 as occurring after the user notification operation 1020, the update operation 1022 and the document add operation 1024 may occur at any time during or after the after the parsing operation 1010. Furthermore, the update operation 1022 and the document add operation 1024 may not occur at the same time, or each time, a new document is processed. For example, in one implementation, the update operation 1022 is performed frequently in order to ensure that any profile updating operation has access to up-to-date information. However, for reasons of efficiency, a number of document add operations 1024 may be carried out periodically, such as in a batch process, after a number of new documents have been processed.

Figure 11:
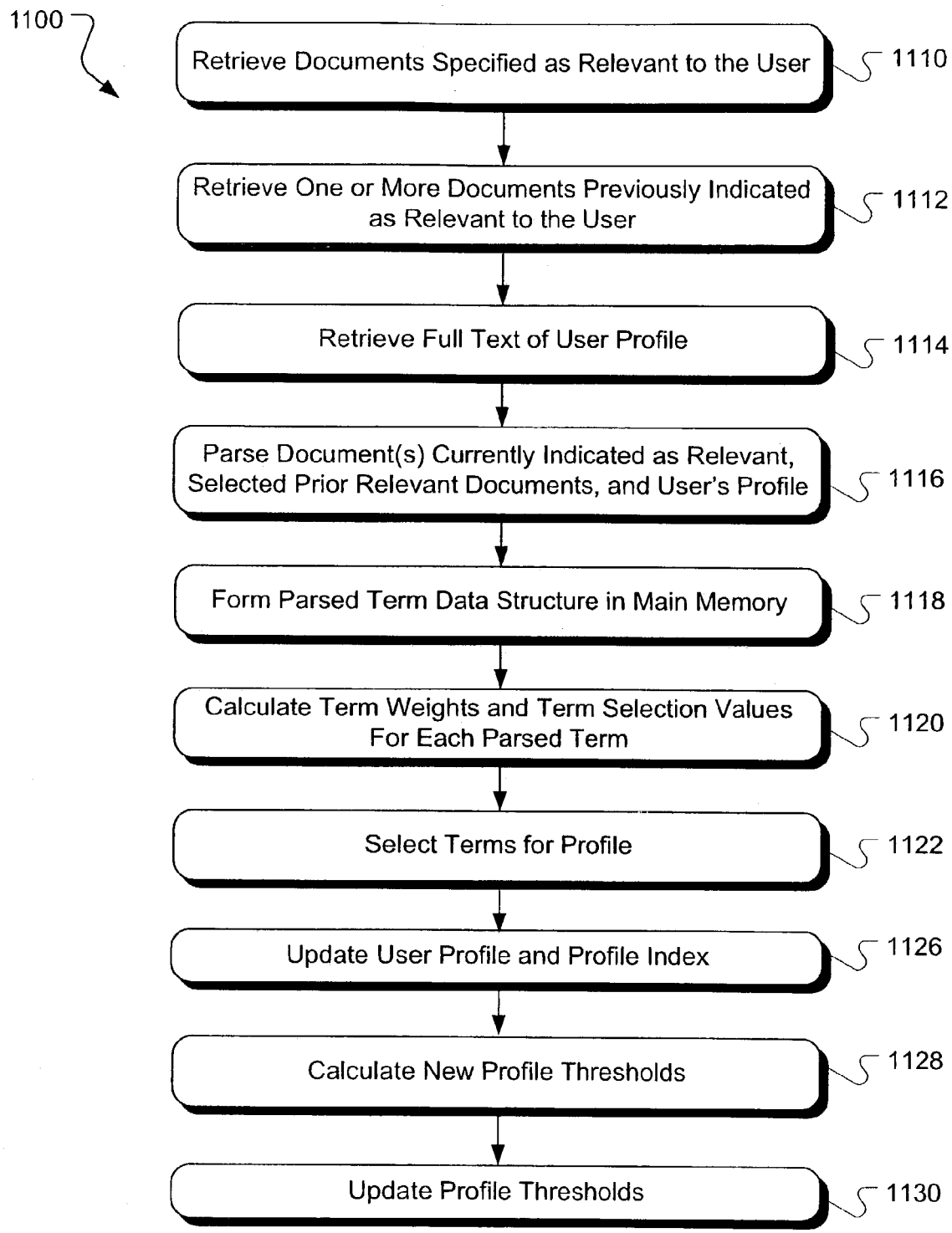
FIG. 11 illustrates operations for updating data structures in the document filtering system illustrated in FIG. 2 in accordance with one embodiment.

Turning now to FIG. 11, illustrated therein is an operational flow 1100 including operations that may be performed in updating user profile information. As used herein, the term "updated user profile" will be used to indicate a user profile that has been updated in accordance with the operational flow 1100. The operational flow 1100 includes operations that may be performed in response to the receipt of information identifying which of a number of documents previously sent to the user are relevant to a user (the "specified relevant documents"). The information identifying the specified relevant documents may come directly from 11 the user. For example, the user may send a list of documents that the user finds relevant. Alternatively, the information identifying the specified relevant documents may be inferred by the user's reactions to documents that were previously sent to the user.

Regardless as to how the information identifying the specified relevant documents is obtained, once this information is obtained a specified document retrieval operation 1110 retrieves each of the specified relevant documents from the document repository 220. That is, the specified document retrieval operation 1110 copies each of the specified relevant documents from the document repository 220 to the main memory 104. Next, a retrieve previous relevant documents operation 1112 obtains document identifiers for a predetermined number of documents, if any, which were previously indicated as relevant (the "previous relevant documents") to the user, and copies the documents from the document repository 220 to the main memory 104.

In accordance with one embodiment, the document identifiers of the previously indicated relevant documents are stored in a list of relevant documents that is associated with the user profile. In accordance with this embodiment, a list of relevant documents is maintained in main memory for each user profile. In accordance with this embodiment, documents are added to relevant document list after the user associated with the profile, and thus the relevant document list, indicated that a particular document is relevant. Following the retrieve previous relevant documents operation 1112, a profile retrieval operation 1114 then accesses the full text of the user's profile or profiles from the profile repository 222.

After the specified and previous relevant documents and the full text of the user profile have been copied or accessed, in one embodiment a parse operation 1116 parses each of the specified and previous relevant documents and the full text of the user profile. In another embodiment, the parsed data from previous relevant documents is preserved, so that only the specified relevant documents need to be parsed. The parsing operation determines all terms that are present in either of the specified and previous relevant documents or in the full text of the user profile.

Following the parse operation 1116, a data structure formation operation 1118 forms a parsed term data structure including all of the terms determined in the parsing operation 1116. In accordance with one embodiment, the parsed term data structure has the form of the parsed term data file 218 described above with respect to FIG. 9. As described above, associated with each term in the parsed term data structure is a relevant document value indicating the number of specified and previous relevant documents that include the term. The operation of parsing the documents and compiling the term data structure may generate various kinds of statistical information about each term. Specifically, in one implementation, a count is made of the number of relevant documents in which the term occurs, and the information that the term did or did not occur in the text of the user profile is also held in the parsed term data structure. Also associated with each term in the parsed term data structure is a total document value indicating the total number of documents including the term. The total document value may be determined relatively quickly by inspecting the reference dictionary file in the main memory. Also associated with each term in the parsed term data structure is a profile indicator that indicates whether the term was included in the full text of the user profile. Finally, also associated with each term in the parsed term data structure are a term weight and a term selection value that are calculated in an operation 1120.

The term selection value will be used to determine whether or not to include the term in the updated user profile; if the term is to be included, the term weight will serve as the weight of this term within the updated user profile. Both term weight and term selection value are calculated from the statistics already accumulated in the parsed term data structure 218. For example, in one implementation, the term weight is calculated in accordance with the previously mentioned BM25 function, and the term selection value is the product of the BM25 weight and the number of relevant documents in which the term occurs. The information that the term does or does not occur in the original text of the query may also contribute to either the weight or the term selection value or both.

Following the term selection value calculation operation 1120, a term selection operation 1122 selects some terms from the term data structure (the "selected terms"). The number of terms selected may be predetermined, or all terms whose term selection values exceed a predetermined threshold may be selected. In accordance with one embodiment, the term selection operation 1122 first sorts the terms in the term data structure according to term selection values. The term selection operation 1122 then selects a predetermined number of terms having the highest term selection values.

Following the term selection operation 1122, an update operation 1126 updates the user's profile to create the updated user profile. Additionally, the update operation 1126 updates the profile dictionary index, the profile record list and each profile posting record in the profile index to reflect the information contained in the updated user profile.

Next, a threshold calculation operation 1128 calculates a new profile score threshold value for the updated user profile. The calculation of a suitable threshold may depend on the statistical behavior of the new profile containing new terms and weights. For example, in one embodiment, the new profile is presented as a search query to the document index 206. The scores found for the top-ranked documents as a result of this search query provide evidence of this statistical behavior on which to base a threshold calculation. Because the primary concern is with statistical behavior in this embodiment, the fact that document index 206 may not be up to date is not critical. Following the threshold calculation operation 1126, a threshold updating operation 1130 updates the profile score threshold value associated with the profile in the profile threshold file 214.

Although the various embodiments and implementations set forth above have been described in language specific to structural features and/or methodological steps, it is to be understood that the appended claims are not necessarily limited to the specific features or steps described. Rather, the specific features and steps are disclosed as preferred forms of implementing the claimed invention.

The invention claimed is:

1. A system comprising:
   a first computer-readable storage media having stored thereon a reference dictionary file data structure, the reference dictionary file data structure including terms parsed from a plurality of documents stored in a document repository, and terms parsed from a new document received by the system but not stored in the document repository, the plurality of documents and the new document parsed without regard to any user profile, a user profile updated based at least in part on terms from the new document included in the reference dictionary file data structure and feedback from a user regarding relevance of a document received by the user before the system determines whether the new document is relevant to any user, the user profile specifying one or more areas of interest of the user;
   the first computer-readable storage media having stored thereon a parsed term data structure, the parsed term data structure including a one or more parsed terms and a term selection value associated with each of the one or more parsed terms, each of the parsed terms either:
   present in the reference dictionary file data structure indicating at least one document indicated as relevant to the user contains the term, or
   present in an original user profile,
   at least one of the parsed terms present in an original user profile and not present in the reference dictionary file data, the term selection value used for determining whether the associated term is to be included in the undated user profile; and
   a second computer-readable storage media having stored thereon a document dictionary index data structure and the document repository, the document dictionary index data structure including only terms located in the plurality of documents stored in the document repository.

2. A system as defined in claim 1, the feedback from the user inferred from the user's action associated with the new document.

3. A system as defined in claim 1, the first computer-readable storage media including main memory and the second computer-readable storage media including mass storage.

4. A system as defined in claim 1, the parsed term data structure further including an original profile indicator associated with each of the parsed terms in the parsed term data structure, each original profile indicator indicating whether a parsed term associated therewith is present in a specified user profile.

5. A system as defined in claim 1, the parsed term data structure further including a term weight associated with each of the parsed terms in the parsed term data structure.

6. A system as defined in claim 1, the parsed term data structure further including a term weight associated with each term in the parsed term data structure, and a term selection value associated with each term in the parsed term data structure, the term selection value a product of the term weight and a total number of relevant documents in which the term appears.

7. A system as defined in claim 1, further comprising a profile index data structure stored on the first computer-readable storage media, the profile index data structure including a profile term field for a document term, an associated profile count field for a value indicating a number of profile records in a profile records list that include the document term, and an associated profile records list of profile records that include the document term.

8. A system as defined in claim 1, further comprising a profile repository stored on the first computer-readable storage media.

9. A system as defined in claim 1, further comprising the parsed term data structure stored on the first computer-readable storage media.

10. A system as defined in claim 1, further comprising a profile repository stored on the first computer-readable storage media.

11. A system as defined in claim 1, further comprising a profile repository stored on the first computer-readable storage media, and a profile index data structure stored on the first computer-readable storage media.

12. A system as defined in claim 1, further comprising an adaptive document filtering module to update the user profile based on information contained in the parsed term data structure.

13. A system as defined in claim 1, further comprising an adaptive document filtering module operable to receive the new document and to update the reference dictionary file data structure to include terms from the received new document.

14. A system as defined in claim 1, further comprising an adaptive document filtering module operable to receive the new document and to update the document dictionary index data structure to include terms from the received new document.

15. A system as defined in claim 1, further comprising an adaptive document filtering module operable to receive the new document and to update the reference dictionary file data structure and the document dictionary index data structure to include terms from the new received document.

16. A system as defined in claim 1, further comprising an adaptive document filtering module operable to receive a stream of new documents and to update the reference dictionary file data structure after the receipt of each new document in the stream of new documents.

17. A system as defined in claim 1, further comprising an adaptive document filtering module operable to receive a stream of new documents, to update the reference dictionary file data structure after the receipt of each new document in the stream of new documents, and to periodically update the document dictionary index data structure.

18. A system as defined in claim 1, further comprising an adaptive document filtering module operable to receive a stream of new documents, to update the reference dictionary file data structure after the receipt of each new document in the stream of new documents, and to create a parsed term data structure using the reference dictionary file data structure.

19. A system as defined in claim 1, wherein the feedback from the user is received directly from the user.

20. A system as defined in claim 1 wherein the user profile is updated based at least in part on terms from the new document included in the reference dictionary file data structure and the feedback from the user regarding relevance of the document received by the user before the system notifies any user about the new document.

21. A system comprising:

a main memory having stored a reference dictionary file data structure, the reference dictionary file data structure including terms parsed from a plurality of documents stored in a document repository and terms parsed from a new document received by the system but not stored in the document repository, the terms parsed from the plurality of documents and the new document without regard to any user profile, the reference dictionary file data structure including a reference count value indicating a total number of documents that include a term, the total number of documents including documents stored in the document repository and the new document, the reference count value accessible by a user profile update operation for updating a user profile before the system determines whether the new document is relevant to any user, the terms parsed from the new document added to the reference dictionary file data structure as follows:

when a term is included in the document statistics file data structure but not in the reference dictionary file data structure, the term is added to the reference dictionary file data structure and the reference count value in the reference dictionary file data structure associated with the term is initialized to one;

when a term is included in both the document statistics file data structure and the reference dictionary file data structure, the reference count value in the reference dictionary file data structure associated with the term is incremented; and a mass storage having stored the document repository and a document index that indexes terms from documents stored in the document repository.

22. The system of claim 21 wherein the reference count value is accessible by the user profile update operation for updating the user profile before the system notifies any user about the new document.

23. The system of claim 21 wherein the new document is stored in the document repository after the terms parsed from the new document are stored in the reference dictionary file data structure.

24. The system of claim 21 wherein terms parsed from new documents received at the system are added to the reference dictionary file data structure each time a new document is received by the system, wherein the new documents are stored in the document repository in a batch process after a plurality of new documents have been received by the system.

25. The system of claim 21 wherein the main memory further includes a document statistics file data structure, wherein the document statistics file data structure includes:

each term parsed from the new document; and a term frequency value for each term parsed from the new document that indicates a total number of times the term is included in the new document.

* * * * *

UNITED STATES PATENT AND TRADEMARK OFFICE
CERTIFICATE OF CORRECTION

| | | |
|---|---|---|
| PATENT NO. | : 7,516,146 B2 | Page 1 of 1 |
| APPLICATION NO. | : 10/438606 | |
| DATED | : April 7, 2009 | |
| INVENTOR(S) | : Stephen Robertson et al. | |

It is certified that error appears in the above-identified patent and that said Letters Patent is hereby corrected as shown below:

In column 15, line 46, in Claim 1, delete "undated" and insert -- updated --, therefor.

Signed and Sealed this

Third Day of May, 2011

David J. Kappos
*Director of the United States Patent and Trademark Office*